Oct. 12, 1954     H. K. ROBINSON ET AL     2,691,311
SAW SHARPENING MACHINE
Filed Dec. 3, 1949                              6 Sheets-Sheet 1
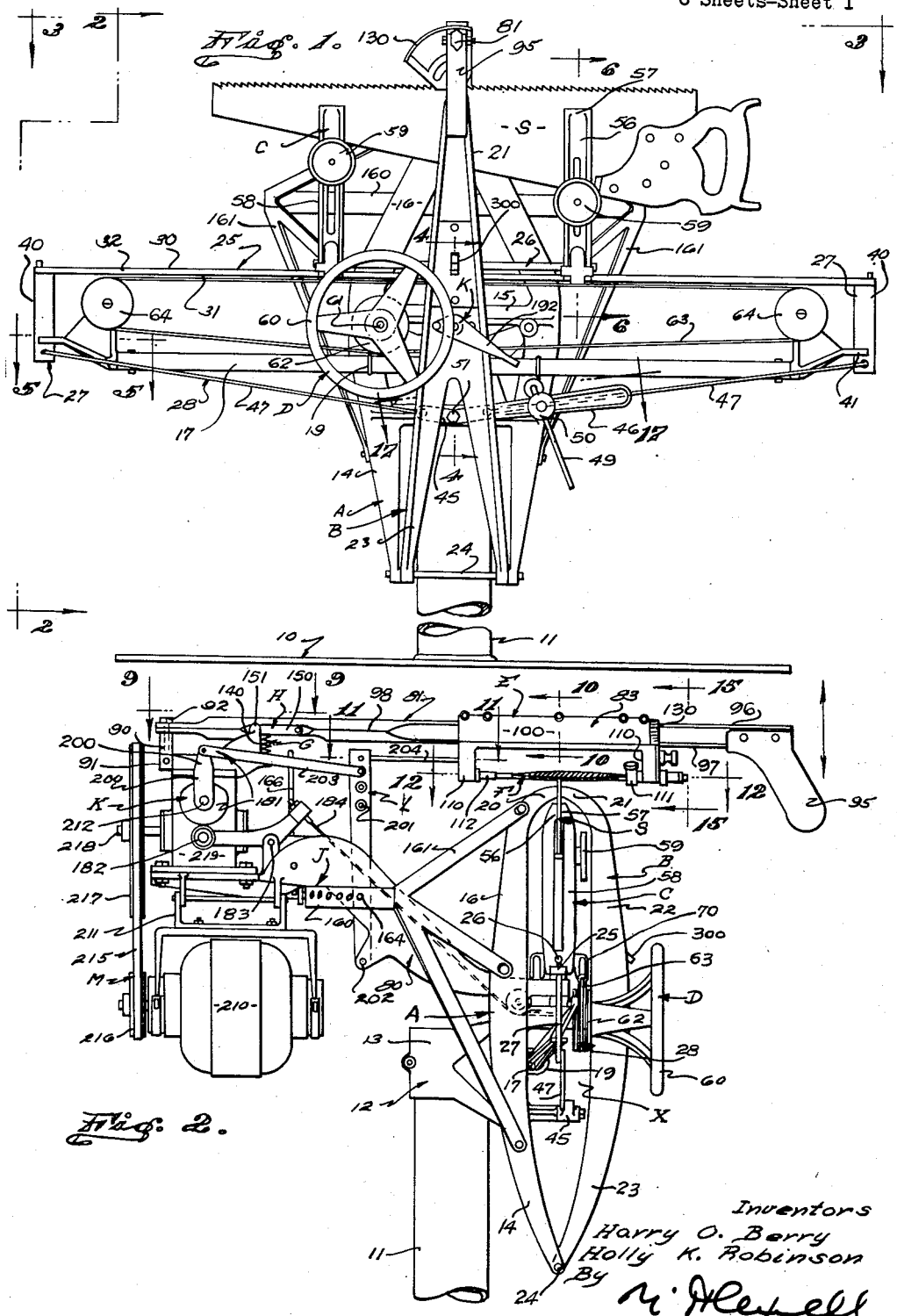
Inventors
Harry O. Berry
Holly K. Robinson
By
M. Hexell
Attorney

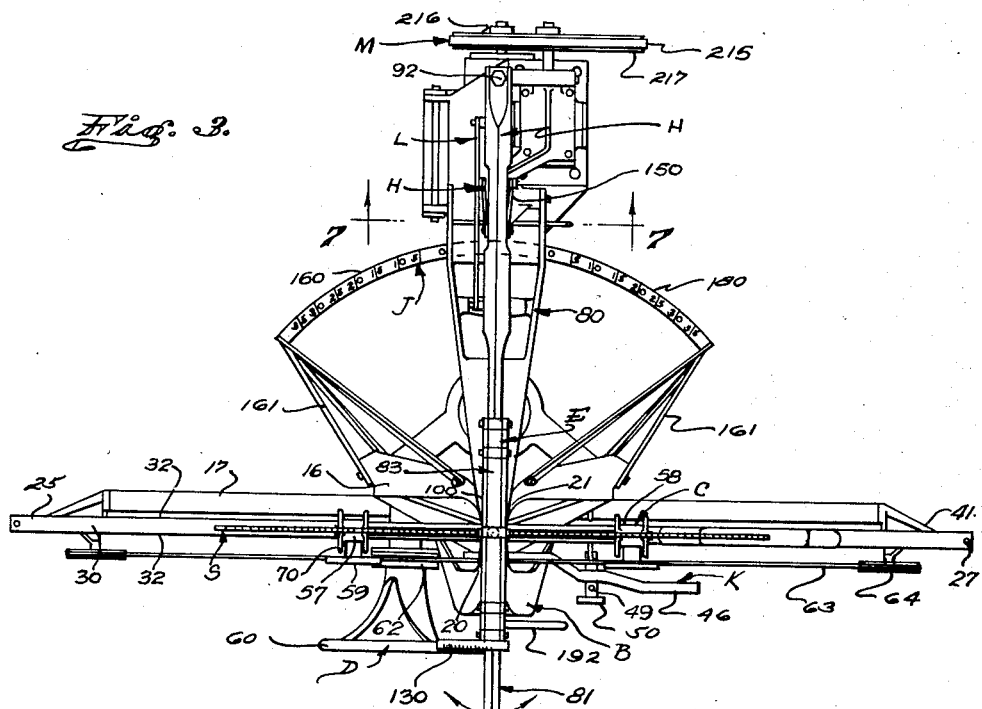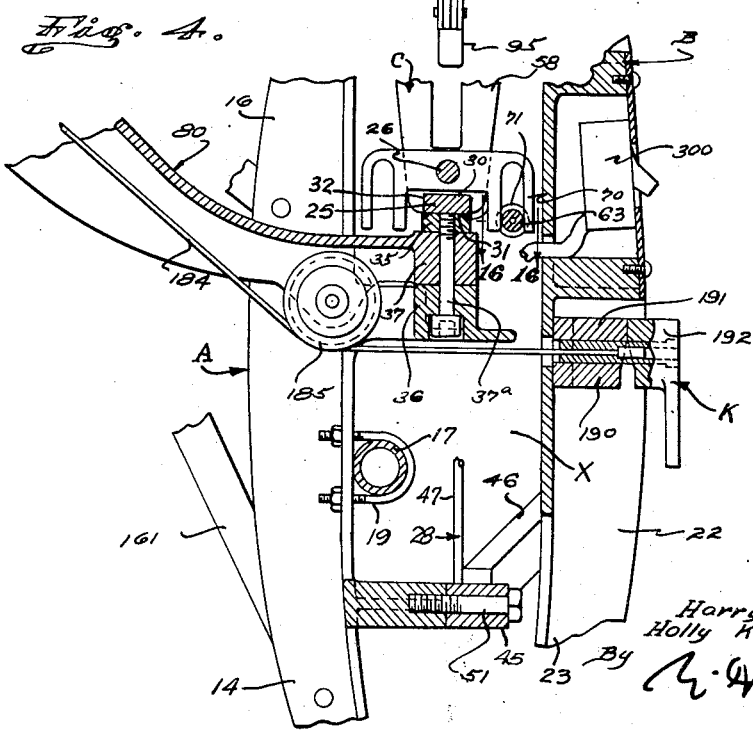

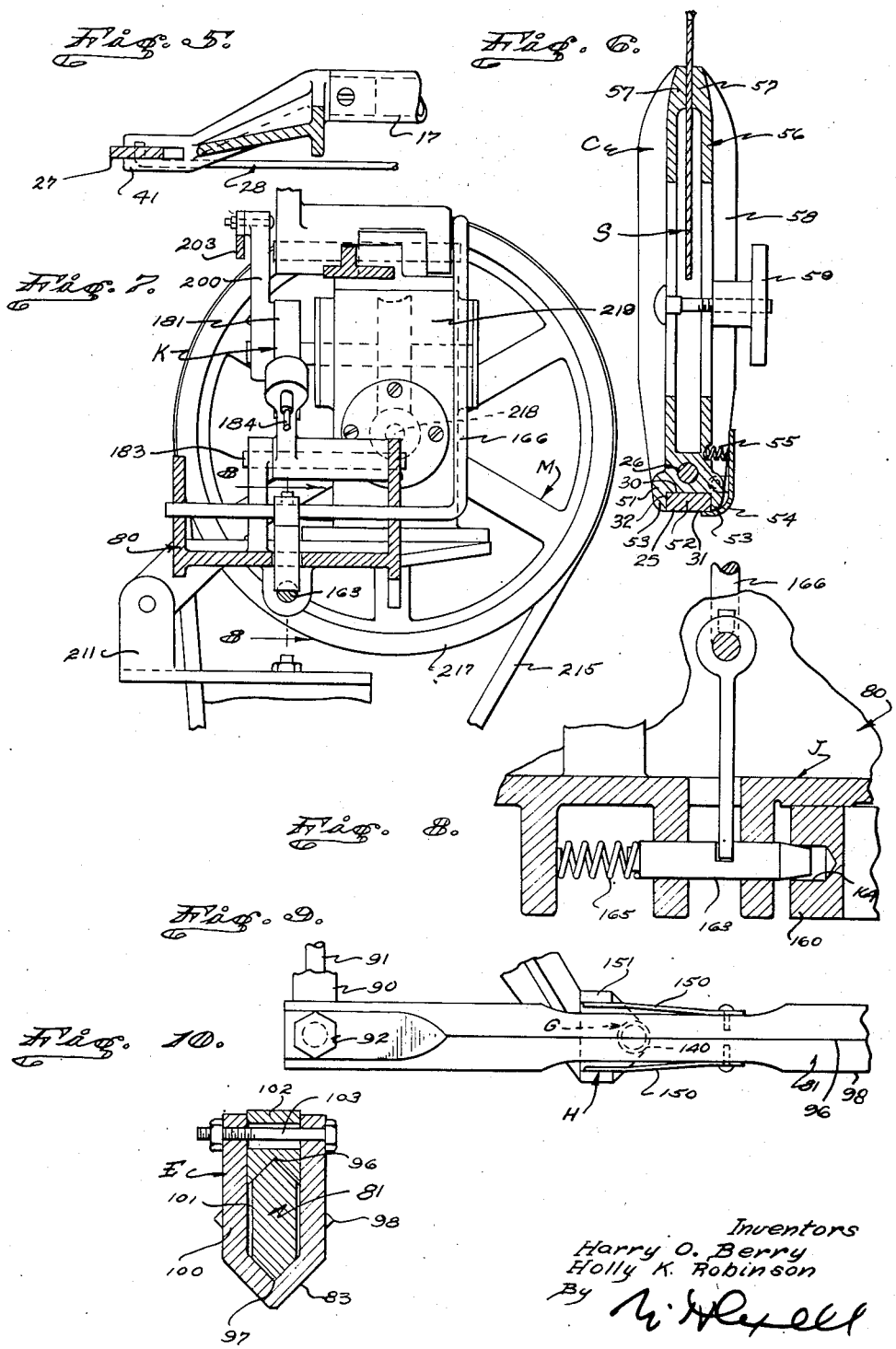

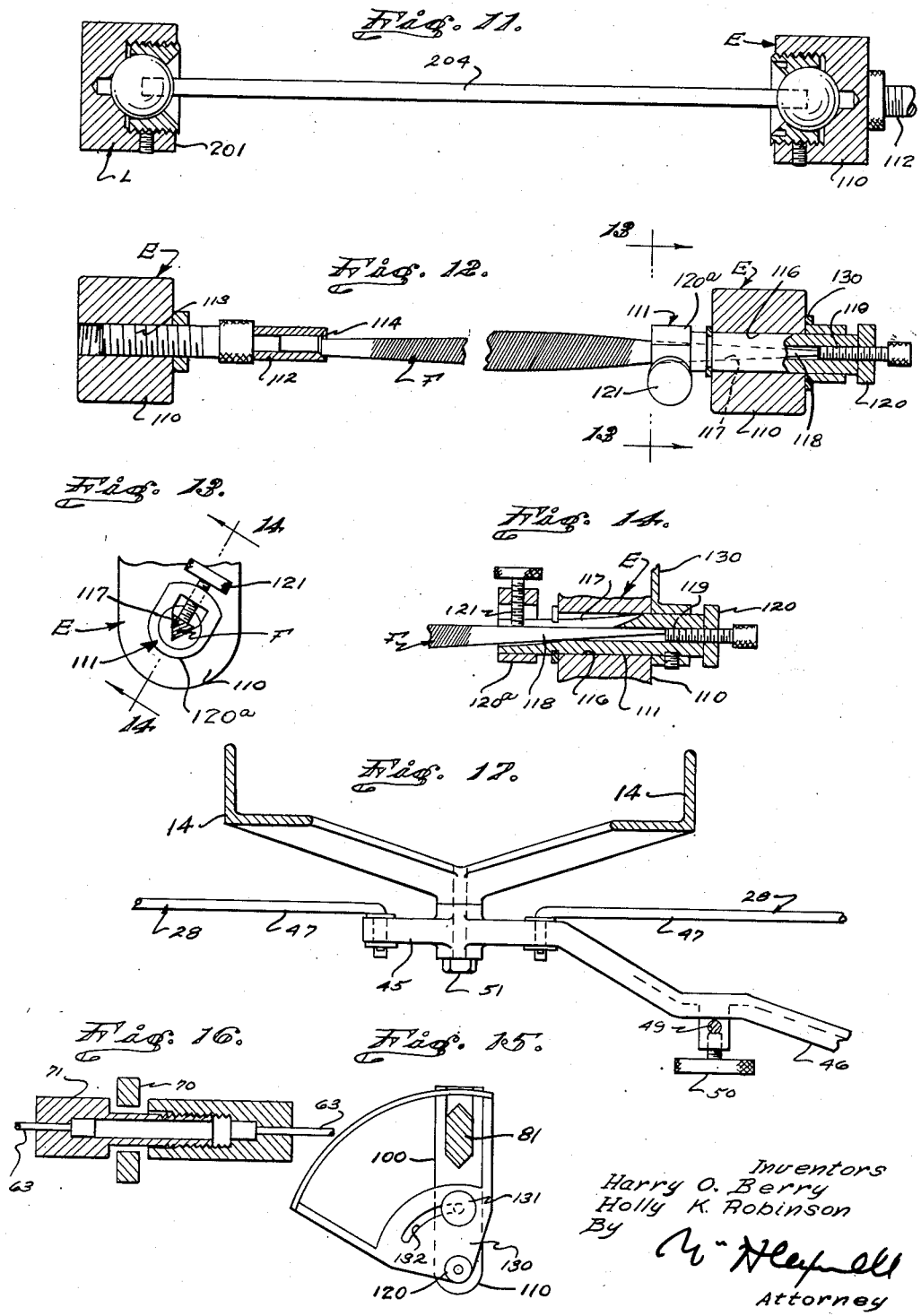

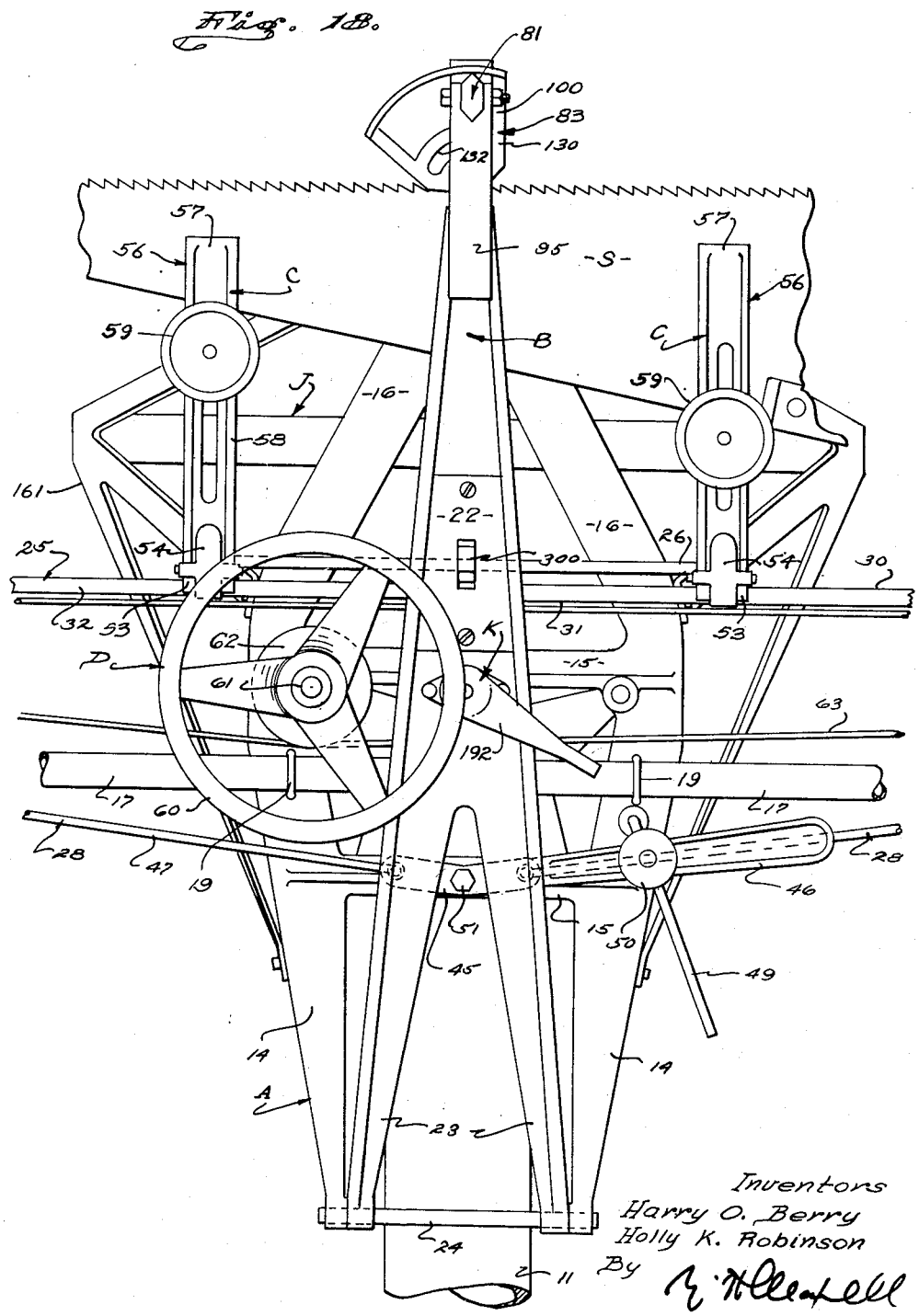

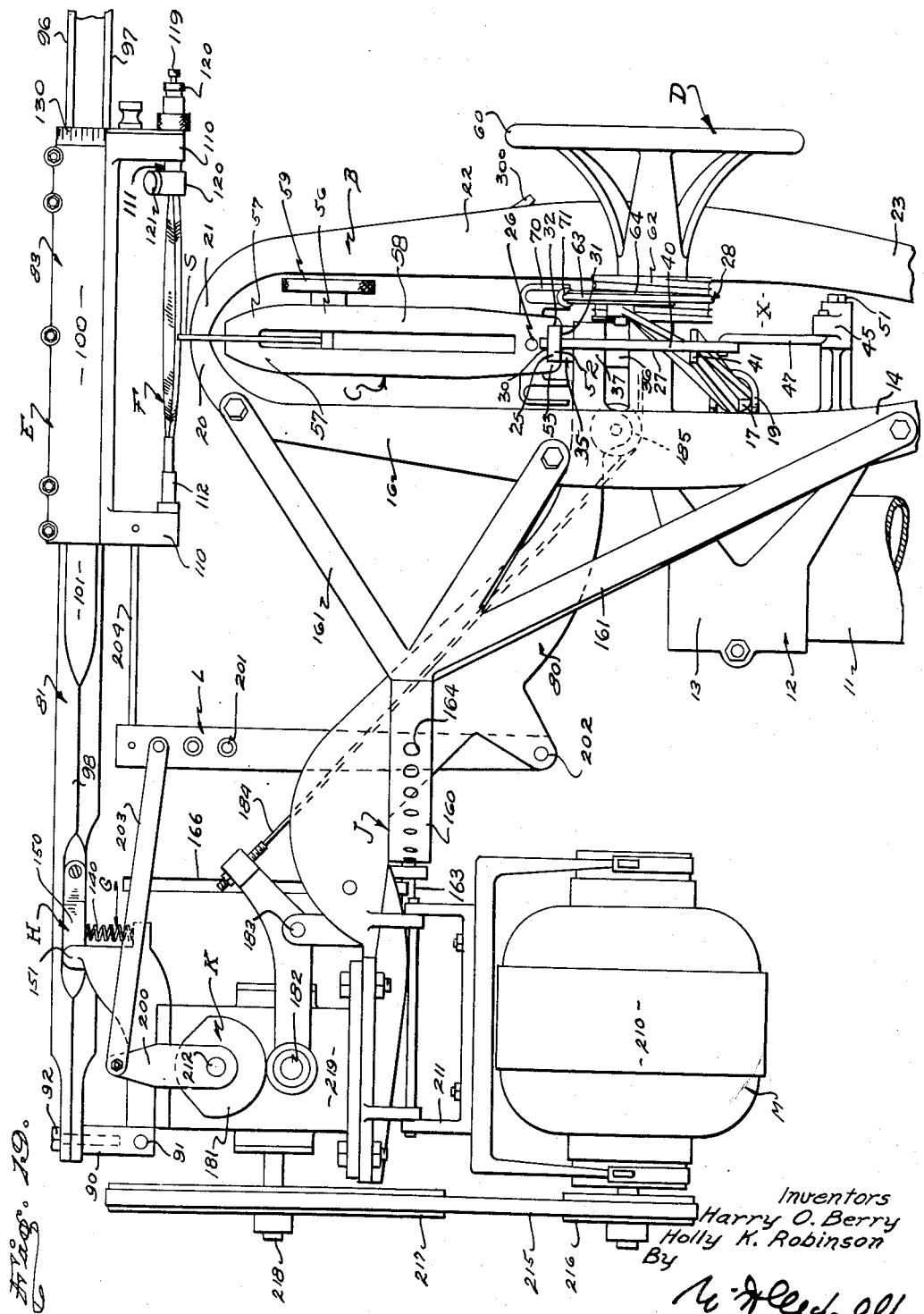

Patented Oct. 12, 1954

2,691,311

UNITED STATES PATENT OFFICE 2,691,311

SAW SHARPENING MACHINE

Holly K. Robinson and Harry O. Berry, Inglewood, Calif.; said Berry assignor to said Robinson Application December 3, 1949, Serial No. 130,922

28 Claims. (Cl. 76—31)

This invention has to do with a saw sharpening machine, it being a general object of the invention to provide a simple, effective, easily operated machine serving to sharpen the teeth of a saw such, for example, as an ordinary wood saw designed for manual operation.

The structure provided by this invention involves, generally, a frame including a base, a standard projecting from the base, and a head on the standard having a cap portion, spaced legs depending from arms on the cap and having spaced lower end portions and posts extending up from the legs and converging to join at their upper ends. The saw clamping means is carried by the frame and operates to releasably hold a saw stationary when being operated on by a tool such as a file. The clamping means includes cooperating inner and outer jaws, the inner jaw being carried by the posts of the frame while the outer jaw is carried by a clamp member located forward of and spaced from the frame parts. The clamp member has lower portions pivotally connected to the lower ends of the legs of the frame. Saw supporting means is carried by or from the frame and includes a rail which is generally horizontal and extends transversely of the frame and supports a carriage which carries saw grips. Mounting means supports the rail and involves a support engaging under the rail at the middle or central portion thereof and structure guiding the ends of the rail for vertical movement. A rail flexing means which is preferably adjustable engages the ends of the rail and operates to deflect the end portions of the rail downwardly from the normal straight horizontal position. This means may be operated so that the rail conforms in contour with a curved saw edge. The carriage operating on the rail is detachable therefrom and can be reversed as to its position on the rail.

Operating means operates the carriage longitudinally of the rail and is a manually operated means involving a hand wheel at the front of the machine, a drum operated by the hand wheel and an operating line wound on the drum and having portions extending therefrom around guide rollers and a portion between the rollers spaced from and parallel with the rail. The last mentioned portion of the line is connected with the carriage so that when said portion of the line is operated the carriage operates therewith.

A tool mounting supports a tool such as a file or the like so it acts on teeth of a saw. The tool mounting includes a neck carried by the frame, preferably for movement about a vertical axis which axis is preferably in the vertical plane of the saw. A guide is coupled to the neck to operate or shift relative thereto on or about vertical and horizontal axes and it extends over the saw. A tool holder is slidable on the guide and adjustably supports a tool or file in position to act on the teeth of the saw in the desired manner. A means normally yieldingly holds the guide up so the tool is clear of the saw and a means normally yieldingly holds the guide in a central position so that it is in a vertical plane intersecting the vertical axis about which the neck moves. A stop means serves to set the neck against pivotal movement. An operating means is provided for the clamp member and is a cam means involving a rotating cam and a pivoted follower which operates a line that is adjustably coupled with the clamp member. An operating means is provided for operating the tool holder along the guide and involves a rotating crank arm, a rocker, a link between the arm and rocker and a link between the rocker and the tool holder. A drive is provided for the operating means actuating the clamp member and the operating means actuating the tool holder. The drive means preferably involves a prime mover, and an operating shaft driven from the prime mover and carrying both the cam and the crank.

A general object of this invention is to provide a mechanism of the general character hereinabove referred to which for operation requires certain manual manipulations while actions requiring the expenditure of an appreciable amount of energy are performed through mechanism operated by a prime mover.

Another object of this invention is to provide a mechanism of the general character referred to in which the tool that engages the teeth of the saw is so mounted and operated as to act on the teeth to sharpen them in the desired manner. A further object of this invention is to provide a machine of the general character referred to in which a clamp means is provided for releasably holding a saw that is supported on a shiftable carriage while power means is provided for reciprocating a cutting tool, the clamp means and power means being coordinated so that the saw is clamped tight and held secure while the cutting tool is acting to cut the saw.

It is another object of this invention to provide a structure of the general character referred to involving a compact simplified arrangement of parts making the machine practical for general use and inexpensive of manufacture.

The various objects and features of our invention will be fully understood from the following detailed description of a typical preferred form and application of the invention, throughout which description reference is made to the accompanying drawings, in which:

Fig. 1 is a front elevation of a machine embodying the present invention showing a saw in place therein and the machine ready for operation so that a tool such as a file is operated in a direction transverse of the saw.

Fig. 2 is an end elevation of the structure shown in Fig. 1, being a view taken substantially as indicated by line 2—2 on Fig. 1.

Fig. 3 is a plan view of the structure shown in Fig. 1 being a view taken as indicated by line 3—3 on Fig. 1.

Fig. 4 is an enlarged vertical sectional view of a portion of the machine taken as indicated by line 4—4 on Fig. 1.

Fig. 5 is an enlarged detailed sectional view taken as indicated by line 5—5 on Fig. 1.

Fig. 6 is an enlarged detailed sectional view taken as indicated by line 6—6 on Fig. 1.

Fig. 7 is an enlarged detailed sectional view taken as indicated by line 7—7 on Fig. 3.

Fig. 8 is an enlarged detailed sectional view of a part of the mechanism provided for setting the neck of the machine against pivotal movement taken as indicated by line 8—8 on Fig. 7.

Fig. 9 is an enlarged plan view taken as indicated by line 9—9 on Fig. 2.

Fig. 10 is an enlarged sectional view taken as indicated by line 10—10 on Fig. 2.

Fig. 11 is an enlarged sectional view taken as indicated by line 11—11 on Fig. 2.

Fig. 12 is an enlarged plan section taken as indicated by line 12—12 on Fig. 2.

Fig. 13 is a transverse sectional view taken as indicated by line 13—13 on Fig. 12.

Fig. 14 is a longitudinal sectional view taken as indicated by line 14—14 on Fig. 13.

Fig. 15 is a transverse sectional view taken as indicated by line 15—15 on Fig. 2.

Fig. 16 is an enlarged view taken substantially as indicated by line 16—16 on Fig. 4.

Fig. 17 is an enlarged view taken substantially as indicated by line 17—17 on Fig. 1.

Fig. 18 is an enlarged view of the central portion of Fig. 1.

Fig. 19 is an enlarged view of parts shown in Fig. 2.

The machine embodying the present invention includes, generally, a frame A, saw clamping means B, saw supporting means C, operating means D for the saw supporting means C, a tool mounting E carrying a cutting tool such as a file F or the like, means G normally yieldingly holding the tool mounting in position where the file F is clear of the saw S, means H normally yieldingly holding the tool mounting in a middle or central position, so it is shiftable in either direction horizontally from such position, stop means J stopping or setting the tool mounting in a position so that the file works at a predetermined angle relative to the teeth of the saw, operating means K for the saw clamping means B, operating means L for the tool holding means E, and a power operated drive means M for the means K and L.

The frame A is a rigid stationary element or structure that carries and in some instances is cooperatively related to other parts of the machine. In the form of the invention illustrated the frame involves, generally, a base 10 engageable with a suitable support such as a floor, or the like, a standard 11 projecting upwardly from the base, and a head 12 on or carried by the standard. The head involves various elements or features and is preferably formed so that it has a cap 13 that engages and which is carried by the upper end of the standard 11, spaced arms 15 that extend horizontally and which are carried by the cap, spaced legs 14 which are carried by and which depend from the arms 15, posts 16 that project upwardly from the arms and converge to support the inner jaw of the means B, and a bar 17 supported by the structure just named and extending horizontally so that it projects in opposite directions at the two end portions of the machine.

The arms 15 are straight horizontally disposed parts of the frame attached to the cap and located forward of the cap so that they serve as effective carriers or supports for the legs and posts. The legs 14 extend downwardly a substantial distance from the arms 15 and as they descend from the arms they project somewhat forward or away from the standard 11 so that their lower end portions are forward of the arms. The posts 16 project upwardly and converge from the uppermost arm 15 and they join at their upper end portions which are turned or shaped so that they project forward and act to support the inner jaw of the means B forward of the arms and well above the arms of the frame. The cross bar 17 of the frame is shown as a part formed separate from those above mentioned and joined thereto by suitable fasteners 19. The bar is of substantial length and extends horizontally from or beyond the legs, as clearly shown in Fig. 1 of the drawings.

The saw clamping means B operates to releasably hold the saw S stationary when the sharpening tool or file F is acting upon the saw to make a cut. The means B as shown in the drawings is characterized by cooperating inner and outer clamp jaws 20 and 21 and a clamp member 22 pivoted to the legs 14 and carrying the outer jaw. The inner jaw 20 of the means B is carried by and faces forward from the upper joined ends of the posts 16. The jaw 21 is carried by the upper end of the clamp member 22 and opposes the jaw 20 as clearly shown in Fig. 2 of the drawings. The clamp member 22 is an elongate part corresponding in length with the combined leg and post construction of the frame above described, and it has its lower end portion divided or bifurcated into spaced parts 23 which are pivotally connected to the lower ends of the legs 14 by a pivot member 24, the axis of the member 24 being horizontal and extending lengthwise of the machine. In the preferred form of the invention the lower end portion of the clamp member 22 or that portion of such member having the parts 23 extends downwardly and somewhat rearwardly while the upper end portion of the member 22 that carries the jaw 21 is curved or formed to project rearwardly. Through the construction above described it will be apparent that the frame parts 14 and 16 cooperate with the clamp member 22 to define a space X in the machine which will accommodate various other elements of the structure as shown throughout the drawings. In the preferred form of the invention portions of the structure just described may be made slightly flexible, for instance, the lower end portions of the legs 14 and the parts 23 of the clamp member 22 may be downwardly tapered so that they are of minimum size where they are pivotally connected, thus providing a construction which will yield somewhat under the clamping or actuating forces generated by the means K hereinafter described.

The saw supporting means C involves, generally, a rail 25, a carriage 26 operating on the rail 25, mounting means 27 supporting the rail in or from the frame A and rail flexing means 28. The mounting means 25 preferably supports the rail at its center and guides it at the ends.

The rail 25 may be a simple, normally straight, elongate element that is horizontally disposed and which extends lengthwise of the machine as shown in Figs. 1, 2 and 3 of the drawings. In the case illustrated the rail is shown as rectangular in cross sectional configuration, in which case it has a flat top 30, a flat bottom 31 and flat vertically disposed sides 32. The rail is of such length as to support the carriage 26 so that the saw can be moved beneath the file F a distance equal to or greater than the length of the saw.

The mounting means 27 supports the rail 25 so that it can be flexed or deformed from its normal straight condition to have a slight curvature corresponding to that which may occur in the toothed edge of a saw which is being sharpened. In the form of the invention illustrated the means 27 includes structure supporting or guiding the rail at both ends and engaged under the rail intermediate its ends or at a central point. In the structure shown in the drawings a depending boss 35 is provided on the bottom 31 of the rail midway between the ends of the rail and the boss 35 is supported from a fixed abutment 36 provided in the frame A. In the particular construction illustrated a collar 37 is interposed between the boss 35 and abutment 36, in which case a pin 37ª extends between the boss and the abutment and through the collar so that it acts as a pivotal support for the collar.

The structure just described supports the middle or center of the rail immediately beneath or in the vertical plane of the saw S. The portions or means 27 that occur at the ends of the rail are alike at each end of the rail. In the particular case illustrated a lateral extension 40 is provided on the rail at each end thereof and such extension depends from the rail to be received in and guided vertically by guides 41 provided on and projecting from the end of the bar 17. Through the construction just described the rail 25 is supported at its center and its ends are guided for vertical movement, the guides 41 at the two ends of the rail serving to maintain the rail in proper alignment lengthwise of the machine.

The means 28 provided for flexing the rail 25 acts to depress or lower end portions of the rail and it is preferably an adjustable or variable means that can be actuated to varying degrees and which can be set in any desired actuated position. The means 28 may, in practice, vary widely in form and construction. However, in the drawings it is shown as involving a pivoted cross arm 45 with an operating lever 46 projecting therefrom and rods 47 which connect the arms with the lower ends of the rail parts 40. The setting means is provided for clamping or setting the parts just named in any desired position and it is shown in the drawings as involving a rod 49 pivoted at the frame A and engaged through the lever 46 to be clamped to the lever 46 by a screw clamp 50. The structure just described is such that when the lever 46 is rotated or swung about the pivot member 51 that carries the cross arm 45 the cross arm is rotated, causing the two rods 47 to be operated in opposite directions. The rods can be operated so that they are moved inward or pulled together, in which event the structure operates to depress or lower the ends of the rail 25. Through the construction described the desired flexure of the rail can be gained and when the rail is in the desired position the mechanism can be set by the element 50.

The carriage 26 of the means C is an elongate structure or element that extends parallel with the rail 25 and it has depending end portions 51 which engage or ride upon the rail 25. Each end portion has a face 52 that is flat and which rides upon the top 30 of the rail and it has rigid depending side flanges 53 engaging the sides 32 of the rail while a pivoted retainer 54 normally held in position by a spring 55 engages under the rail to releasably maintain the carriage on the rail.

Through this construction the carriage is supported by or from its end portions and is movable lengthwise of the rail and by releasing the retainers 54 it can be detached from the rail and turned end for end as circumstances may require.

Saw grips 56 project upwardly from the carriage 26 at the ends thereof to support a saw S in a vertical plane with its upper toothed edge substantially horizontal, as shown in Fig. 1 of the drawings. Each grip is shown as including opposed jaws 57 carried on upwardly projecting arms 58 that can be sprung or flexed somewhat to allow the jaws to be moved into gripping engagement with the saw. A screw clamp means 59 extends between the jaw supporting arms 58 and can be operated so that the jaws 57 are engaged with the saw in the desired manner.

The operating means D for the carriage 26 of the means C is a manually operated means and in the form of the invention it involves, generally, a hand wheel 60 carried on a horizontal forwardly projecting shaft 61 so that it can be turned or rotated. A drum 62 is fixed to and rotates with the shaft and an operating line 63 is carried or wound on and is operated by the drum. The line extends in opposite directions from the lowermost portion or side of the drum and is guided over guide rollers 64 located at the ends of the machine where they are supported at the ends of the bar 17 of the frame. The line 63 has a portion that extends between the guide rollers 64 which portion of the line is straight and parallel with the rail 25. In the arrangement illustrated the said portion of the line 63 between the rollers 64 is located somewhat forward of the rail 25. A suitable releasable coupling means is provided to connect the portion of the line 63 extending between the roller 64 and the carriage 26. In the case illustrated this coupling means involves a downwardly faced or opening yoke 70 on one side of the carriage and a block 71 fixed on said portion of the line, the block being in the nature of a spool so that it has a center portion that is received in the yoke while end flanges engage the sides of the yoke. Through this construction a releasable couple or connection is provided between the carriage and the line. In the preferred construction yokes 70 are provided at each side of the carriage 26 so that a yoke is available to engage the block 71 when the carriage is reversed or in either position on the rail.

The tool mounting E which supports the tool or file F carries the file so that it will act on teeth of the saw S and will operate transversely of the plane of the saw and at the desired angle relative to the saw or to the teeth of the saw. In accordance with the invention the means I involves, generally, a neck 80 which is carried by or from the frame A and projects rearwardly therefrom, a guide 81 connected to or coupled with the neck to operate or shift relative thereto about a horizontal axis and also about a vertical axis, and a tool holder 83 carried by the guide 81. The neck is joined to or is a part of the collar 37 hereinabove described and in the particular case illustrated it projects rearwardly and upwardly from the point where the collar is engaged beneath the rail and on the abutment 36. The collar being pivotally carried by the pin 37ª, the neck, which is in effect a part or extension on the collar, can be swung or pivoted about the axis of the pin 37ª. Various elements of the construction are carried on the outer or upper end portion of the neck 80 and may in effect be considered a part thereof, and the guide 81 is suitably coupled to the structure on the upper or outer end of the neck. In the case illustrated the guide 81 is connected or coupled to a part fixed on or carried by the end of the neck through a link 90 pivoted to such part of the neck by a horizontal pivot pin 91. The guide is pivoted to the link 90 by means of a vertical pivot pin 92.

The guide 81 is preferably a straight elongate element or bar that extends substantially horizontal and forward from the point where it is carried by the link 90 and it extends across the saw or above the saw so that its forward end terminates at the front of the machine where it is provided with a suitable operating handle in the form of a grip 95. In the particular case illustrated the guide 81 is in the form of a bar square in cross section and it is so positioned as to have one upwardly facing edge 96 while another edge 97 faces downwardly, the other two edges 98 being side edges that face horizontally.

The tool holder 83 is mounted on the guide 81 to move lengthwise thereon or to reciprocate thereon and in the form of the invention illustrated it involves a body 100 which embraces the rod that forms the guide 81. In the particular structure shown in the drawings the body is an upwardly faced U-shaped element which embraces the guide 81 where it has flattened sides 101 that are parallel and vertically disposed, and an adjustable section 102 enters the upper portion of the body to embrace the upper portion of the guide and is clamped in the desired adjusted position by a screw clamp 103. The body 100 just described has depending end portions 110 between which the file or tool F is supported so that the file is parallel with the guide and with the body 100 and is in position to engage the teeth of the saw S.

In the particular case illustrated the file F is supported between the depending end parts 110 of the body 100 by a socket member 112 carried by one end part 110 and an adjustable holder 111 carried by the other end part 110. The socket member 112 has a stem 113 engaged in an opening in its supporting end part 110 and it has a horizontally faced socket opening 114 that will receive the end of a file or the like. The adjustable holder 111 best shown in Figs. 12, 13 and 14 of the drawings is an elongate member rotatably supported in an opening 116 in the other end portion 110 of the body. The holder 111 has a longitudinal channel or slot 117 formed in it from the end which faces the socket 114, the channel being such as to receive the tapered end 118 of the file F. A stop 119 is threaded in the member 111 to engage the end 118 and can be adjusted to hold the file tight in the socket 114. A lock nut 120 is provided for setting the stop in the desired position. The end portion 118 may be set or retained in the channel or groove 117 in member 111 as by a clamp collar 120ª surrounding the projecting portion of member 111 and by carrying a clamp screw 121 that can be tightened against one of the flat sides of the end portion 118 of the file. The member 111 is rotatable in the opening 116 so the file can be arranged in any desired rotative position. To set the member 111 in the desired rotative position a segmental projection 130 is provided on the member 111 and projects therefrom adjacent the end portion of the body which supports member 111. A screw clamp 131 is carried by said end portion of the body 100 and operates in a segmental opening 132 as shown in Fig. 15. Through the construction just described it will be apparent that the file can be rotated through a suitable range and can be set in any desired position within that range.

The means G acts to normally yieldingly hold the guide 81 in an up position where the file F is out of engagement with the saw. In the form of the invention illustrated the means G involves a spring 140 that acts between a fixed abutment and engages under the guide 81. It will be apparent that the spring 140 needs only to lift the guide 81 a limited amount from the operating position in order to lift the file from the teeth of the saw and with the arrangement shown in the drawings the spring 141 is near the axis of the pivot 91 so that a person gripping the handle 95 has a substantial mechanical advantage and can very easily depress the guide 81 to bring the file into the desired position in engagement with the teeth of the saw.

The means H normally yieldingly holds the guide 81 in a position about the axis of member 92 so that it extends across the saw and intersects the vertical axis of the pin 37ª which carries the neck 80. The means H is such as to allow for limited movement or deflection of the guide 81 in either direction from the said position intersecting the axis of pin 37ª. In the particular case illustrated the means H involves leaf springs 150 on the sides of the guide 81, which springs engage or react against upwardly projecting lugs 151 between which the guide 81 is engaged and which are spaced from the sides of the guide far enough to allow the guide to have the desired movement against the resistance of the springs, this structure being shown in Fig. 9 of the drawings. In practice the spring 140 and the lugs 151 above described may be supported by or carried on suitable parts at the outer or upper end of the neck structure 80.

The stop means J is provided to set the neck 80 in various rotative positions about the axis of the pin 37ª. In the particular case illustrated a segmental rest 160 is supported from the frame A by arms 161 so that it is concentric with the axis of pin 37ª and is engaged under the neck at a point removed a substantial distance from the pin. The stop means J is shown as including a stop pin 163 slidably carried by the neck 80 to cooperatively engage one or more sockets 164 provided in the segmental rest 160. The stop pin 163 is shown normally yieldingly held in socket engaging position by a spring 165 and a manually operable pivoted lever 166 engages the stop pin and can be manually operated in the direction indicated by the arrow in Fig. 8 so that the stop pin is withdrawn from the segment 160. It will be apparent that by providing sockets 164 at suitable intervals lengthwise of the neck supporting segment 160, and in both directions from a normal position, the neck can be adjusted as desired. A normal position of the neck may be considered a position in which the neck extends so that it supports the guide 81 in a direction normal to the plane of the saw. It is to be observed that the segmental rest is provided with suitable graduations or markings 180 forming scales by which the position of the neck can be readily determined.

The operating means K provided for operating the clamp member 22 of means B is preferably a cam means and as shown in the drawings it involves a rotating cam 181 and a cam follower 182 engaging the cam and supported by a pivot pin 183. The pivoted cam follower is in the nature of a bell crank one arm of which carries a roller that engages the cam while the other arm carries an operating line 184 which extends to and which operates the clamp member 22. In the particular arrangement illustrated the line 184 operates over a guide roller 185 and is connected to the clamp member 22 by a suitable coupling mechanism 190. The particular coupling mechanism illustrated in the drawings involves a cam part 191 fixed on the clamp member 22 and a cam part 192 rotatable relative to part 191 and having the line 184 anchored to it. The cam parts 191 and 192 are so shaped and related that by rotation of the cam part 191 the effective length of the line 184 can be varied. In practice it is preferred that the parts be normally set so that the line 184 is normally of minimum length and whenever it is desired to release the clamp member 22 and regardless of the position of cam 181 this action can be gained by rotation of the cam part 192 to a position where the effective length of the line 184 is increased.

The operating means L provided for operating the tool holder acts to reciprocate the tool holder 83 on or along the guide 81. In the case illustrated the means L involves a rotating crank 200, a rocker 201 pivotally supported at 202, a link 203 pivotally connecting the crank 200 and the rocker 201 and a link 204 connecting the rocker 201 and the body of the holder 83. In the preferred form of the invention the link 203 is pivotally connected to the outer end of the crank arm 200 and it can be connected to various points along the rocker 201 so that the action of this means can be adjusted or varied as desired. The link 204 is preferably connected to the outer end of the rocker 201 and to the body of the tool holder 83 by universal connections. In the drawings and particularly in Fig. 11 we show ball and socket type of connections which allow for the desired flexibility or universal movement between the oscillating end of the rocker 201 and the body of the tool holder.

The drive means M provided by the present invention is a power means causing the cam 181 of means K to operate in synchronism with the crank arm 200 of the means L. In the particular case illustrated in the drawings the means M includes a prime mover in the form of an electric motor 210 carried on the outer end portion of neck 80 by a bracket 211 so the motor depends from the neck. A single shaft 212 carries both the cam 181 and the crank arm 200, these elements being fixed to the shaft. A suitable drive is provided from the motor 210 to the shaft 212. In the particular case illustrated this drive involves a belt 215 operated by a drive pulley 216 on the motor shaft and running over a driven pulley 217 on the shaft 218 of a gear mechanism 219. The shaft 212 is a shaft of or is operated by the gear mechanism. The structure just described is such that the desired speed reduction is obtained between the motor 210 and the shaft 212.

With the mechanism above described it will be apparent that the cam 181, being on the same shaft as the crank arm 200, is synchronized with the crank arm, with the result that the clamp member 21 of means B is operated in synchronism with the tool carrier 83. The parts are so related that the clamp member 21 is set to clamp the saw against movement immediately before the tool carrier moves in a direction to cause the file to cut and the saw remains held or clamped until the cutting action of the file has been completed, at which time the clamp member 21 is released so that the saw is free to be adjusted or positioned by operation of the means D.

From the foregoing description it will be apparent that the structure provided by the present invention enables an operator to easily and quickly set the machine with the tool or file F at the desired angle relative to the teeth of the saw and when the machine is put in operation, as by closing of a suitably located control switch 309 the clamps of means B and the tool holder of means E operate in synchronism as above described, leaving the guide 81 to be operated or depressed manually in the desired manner, and the means D to be operated as desired to advance the saw beneath the file. In practice the teeth of most saws vary enough so that a fully automatic device does not always work satisfactorily. However, the device of the present invention, having the manual controls above described, enables an operator to apply the desired pressure to the file and to advance the saw beneath the file as desired and as circumstances may require, to the end that a highly satisfactory result is readily obtainable.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A saw sharpening machine including, a frame, a saw clamp including cooperating jaws and a clamp member carrying one of the jaws at its upper end, a saw support including a shiftable carriage adapted to carry the saw in position to be engaged by the clamp, operating means adapted to shift the carriage relative to the clamp, a sharpening tool, a tool mounting including a neck, a guide carried by the neck and extending transversely of the direction of movement of the carriage, and a tool holder carrying the tool and slidably carried by the guide to move lengthwise of the guide, operating means adapted to actuate the holder, means pivotally connecting the neck and guide for movement of the guide about a vertical axis, and power means adapted to synchronously drive the operating means, the frame including, a base, a standard projecting upwardly from the base, horizontally disposed arms supported from the standard, legs depending from the arms and pivotally carrying the clamp member, and converging posts projecting upwardly from the arms and having their upper ends joined and supporting the other jaw, the neck being supported by the frame for pivotal movement about a vertical axis.

2. A saw sharpening machine including, a frame, a saw clamp including cooperating jaws and an upwardly extending clamp member carrying one of the jaws at its upper end, a saw support including a shiftable carriage adapted to carry the saw in position to be engaged by the clamp and being adapted to shift the saw relative to the clamp, operating means adapted to shift the carriage relative to the clamp, a sharpening tool, a tool mounting including a neck, means pivotally supporting the neck, a guide pivotally carried by the neck and extending substantially transverse of the direction of movement of the carriage, and a tool holder carrying the tool and slidably carried by the guide to move lengthwise thereof, operating means adapted to actuate the holder, and power means adapted to synchronously drive the operating means, the frame including, a base, a standard projecting upwardly from the base, transverse arms supported from the standard, legs depending from the arms and pivotally carrying the clamp member, and converging posts projecting upwardly from the arms and having their upper ends joined and supporting the other jaw, the neck projecting rearward from the standard and the guide projecting forward from the rear portion of the neck and over the saw in the carriage and engaged by the jaws.

3. A saw sharpening machine including, a support, means adapted to clamp a saw including cooperating jaws, saw supporting means including a shiftable carriage adapted to carry the saw and to move relative to the jaws, operating means adapted to shift the carriage, a sharpening tool, a tool mounting including, an elongate guide extending transverse of a saw carried by the carriage, means connecting one end of the guide to the support for movement about a vertical axis and about a horizontal axis, and a tool holder carrying the tool and slidably carried by the guide to move lengthwise thereof, a handle on the other end of the guide, operating means adapted to actuate the clamping means, operating means adapted to actuate the holder, and power means adapted to synchronously drive the operating means.

4. A saw sharpening machine including, a support, means for clamping the saw including cooperating elongate jaws adapted to engage the saw and a clamp member carrying one of the jaws, the jaws having opposed heads adapted to engage opposite sides of the saw and being pivot-connected together at a point spaced from the heads and being spaced apart between the heads and said point, supporting means for the saw including a shiftable carriage extending between the jaws and adapted to carry the saw and to move relative to the jaws, manually operable means adapted to shift the carriage, a member pivoted to the support, an elongate guide having one end pivoted to said member and projecting over the carriage in a direction substantially transverse of the direction of movement of the carriage, a sharpening tool, and a tool holder carrying the tool and slidably carried by the guide to move lengthwise thereof, a handle on the other end of the guide, operating means adapted to operate the clamping means, operating means adapted to operate the holder, and power means adapted to synchronously drive the operating means.

5. In a saw sharpening machine, a vertical standard with a lateral projection thereon, a support pivoted to the projection and extending rearwardly therefrom, a saw clamp carried by the standard and including elongate jaws with opposed heads adapted to engage the saw, the jaws being pivoted together at a point spaced below the heads and being spaced apart between the heads and said point, a saw support including a shiftable carriage extending between the jaws and adapted to carry the saw and a track carried by the standard and slidably supporting the carriage for movement relative to the clamp, operating means adapted to shift the carriage along the track, a sharpening tool, a tool mounting including a tool holder carrying the tool and a guide pivoted to the support and slidably supporting the holder and extending across the track above the carriage and above the jaws, operating means adapted to operate the clamp, and operating means adapted to operate the holder.

6. A saw sharpening machine including, a frame, saw clamp means carried by the frame and including cooperating jaws and a clamp member extending upwardly and carrying one of the jaws at its upper end, a saw support including a shiftable carriage adapted to carry the saw and a rail slidably carrying the carriage and supported by the frame, operating means adapted to shift the carriage along the track, a sharpening tool, a tool mounting including a tool holder carrying the tool and adapted to reciprocate in a direction transverse of the track, operating means for the holder, and power means adapted to synchronously drive the operating means, the frame including, a base, a standard projecting upwardly from the base, transverse arms supported from the standard, legs depending from the arms and pivotally carrying the clamp member, and converging posts projecting upwardly from the arms and having their upper ends joined and supporting the other jaw.

7. In a saw sharpening machine, a frame, a saw clamp carried by the frame, a manually shiftable carriage for the saw and carried by the frame, a sharpening tool, a tool mounting including a pivoted guide and tool holder carrying the tool and slidable on the guide to operate transverse of the carriage, a spring normally yieldingly holding the guide with the tool clear of a saw carried by the carriage, the guide being manually operable to move the tool carried by the holder into engagement with the saw carried by the carriage, operating means adapted to actuate the clamp, operating means adapted to actuate the holder, and power means adapted to synchronously drive the operating means.

8. In a saw sharpening machine, a frame, a saw clamp, a support adapted to carry a saw and including, a resilient rail extending between the frame and the clamp, a carriage operable along the rail, and saw grips projecting upward from the carriage and carrying the saw, operating means adapted to shift the carriage along the rail, a sharpening tool, a tool mounting including a tool holder carrying the tool and adapted to reciprocate transversely of the saw carried by the carriage, operating means adapted to operate the clamp, operating means adapted to actuate the holder, power means adapted to synchronously drive the operating means, the rail being normally straight and being flexible into curved form, and means engaging the rail at the end portions thereof and adapted to flex the rail from the position where it is straight.

9. A saw sharpening machine including, a frame, a saw clamp, a saw support including, a normally straight flexible rail extending between the frame and clamp, means operable to flex the rail, a carriage operable along the rail, and saw grips projecting upward from the carriage and adapted to carry the saw, operating means adapted to shift the carriage along the rail, a sharpening tool, a tool mounting carried by the frame and including a tool holder carrying the tool and mounted to reciprocate transversely of the saw carried by the carriage, operating means adapted to actuate the clamp, operating means adapted to actuate the holder, and power means adapted to synchronously drive the operating means.

10. A saw sharpening machine including, a frame, a saw clamp, a saw support including, a normally straight flexible rail extending between the frame and clamp, means operable to flex the rail, a carriage operable along the rail, and saw grips projecting upward from the carriage and carrying the saw, operating means adapted to shift the carriage, a sharpening tool, a tool mounting including a tool holder carrying the tool and mounted to reciprocate, operating means adapted to actuate the clamp, operating means adapted to actuate the holder, and power means adapted to synchronously drive the operating means, the means for flexing the rail including a pivoted cross arm, and oppositely operating ties connecting the cross arm and the ends of the rail.

11. A saw sharpening machine including, a frame, a saw clamp, a saw support including, a normally straight flexible rail extending between the frame and clamp, means operable to flex the rail, a carriage operable along the rail, and saw grips projecting upward from the carriage and adapted to carry the saw, operating means adapted to shift the carriage along the rail, a sharpening tool, a tool mounting including a tool holder carrying the tool and mounted to reciprocate transversely of the saw supported by the carriage, operating means adapted to actuate the clamp, operating means adapted to actuate the holder, and power means adapted to synchronously drive the operating means, the means for flexing the rail including a pivoted cross arm, releasable means adapted to set the cross arm in an actuated position, and oppositely operating ties connecting the cross arm and the ends of the rail.

12. A saw sharpening machine including, a frame, a saw clamp, a saw supporting means including a normally straight flexible rail extending between the frame and clamp means, means operable to flex the rail, a carriage shiftable along the rail, and saw grips projecting upward from the carriage and adapted to carry the saw, operating means adapted to shift the carriage along the rail, a sharpening tool, a tool mounting including a tool holder carrying the tool and mounted to reciprocate transversely of the saw supported by the carriage, operating means adapted to actuate the clamp, operating means adapted to actuate the holder, and power means adapted to synchronously drive the operating means, the means for flexing the rail including a pivoted cross arm, and oppositely operating ties connecting the cross arm and the ends of the rail, the rail being supported from below at a middle point and the ties being operable to lower the ends of the rail.

13. A saw sharpening machine including, a frame, a saw clamp, a saw support including, a normally straight flexible rail extending between the frame and clamp, means operable to flex the rail, a carriage operable along the rail, and saw grips projecting upward from the carriage and adapted to carry the saw, operating means adapted to shift the carriage along the rail, a sharpening tool, a tool mounting including a tool holder carrying the tool and mounted to reciprocate transversely of the saw carried by the carriage, operating means adapted to actuate the clamp, operating means adapted to actuate the holder, and power means adapted to synchronously drive the operating means, means mounting the rail including a fixed support under the rail midway between its ends and guides supporting the end portions of the rail for vertical movement, the means for flexing the rail including a pivoted cross arm, and oppositely operating ties connecting the cross arm and the ends of the rail.

14. A saw sharpening machine including, a frame, a saw clamp supported from the frame, a saw support on the frame including a rail, a shiftable carriage carrying the saw and operable along the rail, operating means adapted to shift the carriage including, a line extending substantially parallel with the rail and a manually operated drum adapted to operate the line, a sharpening tool, a tool mounting including a tool holder carrying the tool and mounted to reciprocate in a direction transverse of the rail, operating means adapted to actuate the clamp, operating means adapted to actuate the holder, and power means adapted to synchronously drive the operating means.

15. A saw sharpening machine including, a frame, a saw clamp supported from the frame, a saw support on the frame including a rail, a shiftable carriage adapted to carry the saw and operable along the rail, means adapted to shift the carriage including, a line extending substantially parallel with the rail, means coupling the line and carriage, and a manually operated drum adapted to operate the line, a sharpening tool, a tool mounting including a tool holder carrying the tool and mounted to reciprocate in a direction transverse of the rail, operating means adapted to actuate the clamp, operating means adapted to actuate the holder, and power means adapted to synchronously drive the operating means.

16. A saw sharpening machine including, a frame, a saw clamp supported from the frame, a saw support on the frame including a rail, a shiftable carriage carrying the saw and operable along the rail, means adapted to shift the carriage including, a line extending substantially parallel with the rail and a manually operated drum carrying the line, the drum having a hand wheel and the line being directed by guide rollers, a sharpening tool, a tool mounting including a tool holder carrying the tool and mounted to reciprocate in a direction transverse of the rail, operating means adapted to actuate the clamp, operating means adapted to actuate the holder, and power means adapted to synchronously drive the operating means.

17. A saw sharpening machine including, a frame, a saw clamp supported from the frame, a saw support carried by the frame including a rail, a shiftable carriage adapted to carry the saw and operable along the rail, means adapted to shift the carriage including, a line extending substantially parallel with the rail, means coupling the line and carriage including yokes on the carriage selectively engageable with a spool-like block on the line, and a manually operated drum carrying the line, a sharpening tool, a tool mounting including a tool holder carrying the tool and mounted to reciprocate in a direction transverse of the rail, operating means adapted to actuate the clamp, operating means adapted to actuate the holder, and power means adapted to synchronously drive the operating means.

18. In a saw sharpening machine, a frame, a saw clamp supported from the frame, a support on the frame carrying a saw for movement lengthwise thereof, a neck pivoted to the frame on a vertical axis in the plane of a saw in the support, a guide carried by the neck and extending over the saw transversely thereof, a sharpening tool and a tool holder carrying the tool and slidable along the guide, means adapted to shift the support, operating means adapted to actuate the clamp, operating means adapted to actuate the holder, and power means adapted to synchonously drive the operating means.

19. A saw sharpening machine including, a frame, a saw clamp carried by the frame, a saw support carried by the frame and including a shiftable saw supporting carriage, a neck pivoted to the frame on a vertical axis in the plane of a saw in the support, a guide pivotally carried by the neck on a horizontal axis and extending over the saw transversely thereof, a sharpening tool, and a tool holder carrying the tool and slidable along the guide, operating means adapted to shift the carriage, operating means adapted to actuate the clamp, operating means adapted to actuate the holder, and power means adapted to synchronously drive the clamp and holder operating means.

20. A machine adapted to handle a saw and sharpening tool including, a frame, a saw clamp carried by the frame, a saw support carried by the frame and including a shiftable carriage, a neck pivoted to the frame on a vertical axis in the plane of a saw in the support, a guide pivotally carried by the neck on a horizontal axis and on a vertical axis and extending over the saw transversely thereof, means normally yieldingly holding the guide against movement about its vertical axis, and a tool holder slidable along the guide and adapted to carry the tool to engage the saw, manual operating means adapted to shift the carriage, operating means adapted to actuate the clamp, operating means adapted to actuate the holder, and power means adapted to synchronously drive the clamp and holder operating means.

21. A saw sharpening machine including, a frame, a saw clamp supported from the frame, a saw support carried by the frame and including a shiftable saw supporting carriage, a neck pivoted to the frame on a vertical axis in the plane of a saw supported by the carriage, a guide pivotally carried by the neck on a horizontal axis and extending over the saw transversely thereof, means releasably holding the neck against movement about its pivotal axis, means normally yieldingly holding the guide against movement about its vertical axis, a sharpening tool, and a tool holder carrying the tool and slidable along the guide, operating means adapted to shift the carriage, operating means adapted to actuate the clamp, operating means adapted to actuate the holder, and power means adapted to synchronously drive the operating means.

22. A machine adapted to handle a saw and a sharpening tool including, a frame, a saw clamp supported from the frame, a saw support including a shiftable saw supporting carriage, a neck pivoted to the frame on a vertical axis in the plane of a saw supported by the carriage, a guide pivotally carried by the neck on a horizontal axis and on a vertical axis and extending over the saw transversely thereof, means normally yieldingly holding the guide against movement about its vertical axis, means releasably holding the neck against movement about its pivotal axis, and a tool holder slidable along the guide and adapted to carry the tool for engagement with the saw, operating means adapted to shift the carriage, operating means adapted to actuate the clamp, operating means adapted to actuate the holder, and power means adapted to synchronously drive the operating means.

23. In a saw sharpening machine, a frame, a saw clamp supported from the frame, a saw support carried by the frame and including a shiftable saw supporting carriage, a neck pivoted to the frame on a vertical axis in the plane of a saw in the support, a guide pivotally carried by the neck on a horizontal axis and on a vertical axis and extending over the saw transversely thereof, a tool holder slidable along the guide and adapted to carry a tool, means normally yieldingly holding the guide against movement about its vertical axis, and means normally yieldingly holding the guide in position where a tool in the holder is clear of the saw, means releasably holding the neck against movement about its pivotal axis, means adapted to shift the carriage, operating means adapted to actuate the clamp, operating means adapted to actuate the holder, and power means adapted to synchronously drive the operating means.

24. A saw sharpening machine including, a frame, a saw clamp supported from the frame, a saw support carried by the frame and including a shiftable carriage, a neck pivoted to the frame on a vertical axis in the plane of a saw in the support, a guide carried by the neck and extending over the saw transversely thereof, means releasably holding the neck against movement about its pivotal axis including an apertured segmental rest carried by the frame and engaged under the neck and a manually operable spring pressed pin carried by the neck and engageable in apertures in the rest, a sharpening tool, and a tool holder carrying the tool and slidable on the guide, means adapted to shift the carriage, operating means adapted to actuate the clamp, operating means adapted to actuate the holder, and power means adapted to synchronously drive the operating means.

25. In a saw sharpening machine, a frame, a saw clamp, a saw support including a shiftable carriage adapted to carry the saw in a vertical plane, means adapted to shift the carriage, a sharpening tool, a tool mounting including a tool holder carrying the tool and mounted to reciprocate, operating means adapted to actuate the clamp including, a rotatable cam laterally spaced from the support and carriage, a follower cooperating with the cam and a flexible line extending from the follower to the clamp, operating means adapted to actuate the holder, and power means adapted to synchronously drive the operating means.

26. In a saw sharpening machine, a frame, a saw clamp supported from the frame, a saw support carried by the frame and including a shiftable carriage carrying the saw, means adapted to shift the carriage, a tool mounting including a tool holder mounted to reciprocate transversely of the saw carried by the carriage, operating means adapted to actuate the clamp including, a rotatable cam, a follower cooperating with the cam, a flexible line operable by the follower, and a manually operated means coupling the line and the clamping means operable to vary the effective length of the line, operating means adapted to actuate the holder, and power means adapted to synchronously drive the operating means.

27. A saw sharpening machine including, a frame, a saw clamp supported from the frame, a saw support carried by the frame and including a shiftable carriage adapted to carry the saw, operating means adapted to shift the carriage, a sharpening tool, a tool mounting including a tool holder carrying the tool and mounted to reciprocate transversely of the saw supported by the carriage, operating means adapted to actuate the clamp including, a rotating cam, a follower cooperating with the cam, a flexible line operable by the follower, and a manually operated means coupling the line and the clamping means operable to vary the effective length of the line, operating means adapted to actuate the holder including, a rotating crank, a pivoted rocker, a connecting rod between the crank and rocker, and a connecting rod between the rocker and the holder, and power means adapted to synchronously drive the operating means.

28. A saw sharpening machine including, a frame, a saw clamp, a saw support including a shiftable carriage carrying the saw, operating means adapted to shift the carriage, a sharpening tool, a tool mounting including a tool holder carrying the tool and mounted to reciprocate, operating means adapted to actuate the clamp including, a rotating cam, a follower cooperating with the cam, a flexible line operable by the follower, and a manually operated means coupling the line and the clamp operable to vary the effective length of the line, operating means adapted to actuate the holder including, a rotating crank, a pivoted rocker, a connecting rod between the crank and rocker, and a connecting rod between the rocker and the holder, and power means adapted to synchronously drive the operating means and including a single shaft carrying the crank and the cam.

References Cited in the file of this patent
UNITED STATES PATENTS

| Number | Name | Date |
|---|---|---|
| 94,890 | Huston | Sept. 14, 1869 |
| 122,929 | Wilsey | Jan. 23, 1872 |
| 255,007 | Myers | Mar. 14, 1882 |
| 308,670 | Hill | Dec. 2, 1884 |
| 527,332 | Howard | Oct. 9, 1894 |
| 847,804 | McAulay | Mar. 19, 1907 |
| 889,180 | Daniels | May 26, 1908 |
| 997,817 | Hobson | July 11, 1911 |
| 1,159,442 | Wasser | Nov. 9, 1915 |
| 1,269,705 | Hall | June 18, 1918 |
| 1,349,685 | McMillan | Aug. 17, 1920 |
| 1,455,917 | Laury | May 22, 1923 |
| 1,468,986 | Wilthil | Sept. 25, 1923 |
| 1,652,454 | Myers | Dec. 13, 1927 |
| 1,728,393 | Collier | Sept. 17, 1929 |
| 1,846,331 | Hickey | Feb. 23, 1932 |
| 1,923,446 | Loibl | Aug. 22, 1933 |
| 2,267,553 | Dale | Dec. 23, 1941 |
| 2,343,171 | Collier | Feb. 29, 1944 |
| 2,429,300 | Wilbert | Oct. 21, 1947 |
| 2,441,786 | Zapart | May 18, 1948 |
| 2,519,735 | Boutin | Aug. 22, 1950 |
| 2,519,748 | Duquette | Aug. 22, 1950 |
| 2,555,569 | Bornholdt | June 5, 1951 |